(12) United States Patent
Mao et al.

(10) Patent No.: US 11,548,739 B1
(45) Date of Patent: Jan. 10, 2023

(54) SYSTEMS AND METHODS FOR AUTOMATED ROBOTIC SORTATION

(71) Applicant: Amazon Technologies, Inc., Seattle, WA (US)

(72) Inventors: Lanhao Mao, Cambridge, MA (US); Jane Shi, Tewksbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 362 days.

(21) Appl. No.: 16/834,525

(22) Filed: Mar. 30, 2020

(51) Int. Cl.
*B65G 47/90* (2006.01)
*B07C 3/18* (2006.01)
*B07C 3/08* (2006.01)

(52) U.S. Cl.
CPC ............. *B65G 47/90* (2013.01); *B07C 3/08* (2013.01); *B07C 3/18* (2013.01); *B07C 2501/0063* (2013.01); *B65G 2203/041* (2013.01)

(58) Field of Classification Search
CPC ........ B65G 47/90; B65G 47/905; B07C 3/08; B07C 3/18; B07C 2501/0063; B07C 2203/041
See application file for complete search history.

(56) References Cited

U.S. PATENT DOCUMENTS

| | | | |
|---|---|---|---|
| 9,555,447 B2 * | 1/2017 | Lykkegaard | B07C 5/02 |
| 2019/0375602 A1 * | 12/2019 | Katagiri | B25J 9/0093 |
| 2020/0017317 A1 * | 1/2020 | Yap | B65G 47/905 |
| 2020/0078941 A1 * | 3/2020 | Oka | B25J 9/1666 |
| 2021/0179356 A1 * | 6/2021 | Chen | G06T 7/62 |

* cited by examiner

*Primary Examiner* — Michael McCullough
*Assistant Examiner* — Jessica L Burkman
(74) *Attorney, Agent, or Firm* — Eversheds Sutherland (US) LLP (57) ABSTRACT

Systems, methods, and computer-readable media are disclosed for automated robotic sortation. In one embodiment, an example system may include a first robotic arm configured to grasp a moving object from a conveyor while the conveyor is in motion, a camera system configured to image objects moving on the conveyor, and a first scanner configured to scan machine-readable codes on objects moving on the conveyor. The system may be configured to sort objects from the conveyor using the first robotic arm based at least in part on an object destination.

17 Claims, 8 Drawing Sheets

SYSTEMS AND METHODS FOR AUTOMATED ROBOTIC SORTATION

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. For example, use of robotic equipment to move or otherwise handle objects may improve efficiency. However, such robotic equipment may have difficulty completing certain tasks. Accordingly, improvements in various operations of order fulfillment, such as improvements to picking technology, sorting technology, packing technology, and so forth may be desired, such that manual efforts can be redirected to different tasks.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Humans may be able to manually handle individual items with ease. However, robotic handling of individual items may require various levels of dexterity. For example, robotic handling of items that are stationary may be relatively more reliable than robotic handling of items that are moving. Moreover, fulfillment centers may include lengthy conveyors that may be used to transport objects, such as packages, products, items, or other objects. In addition, some processes, such as sortation processes, may rely on manual effort to complete.

Embodiments of the disclosure include methods and systems for automated robotic sortation that may improve processing and fulfillment of orders, or other object aggregation tasks. Certain embodiments include systems with robotic arms that can be used to retrieve or otherwise grasp objects while objects are in motion on a moving conveyor, and may further be configured to sort items that are grasped into one or more sort destinations. Some embodiments include one or more robotic systems disposed adjacent to conveyors from which the robotic systems may identify objects on the conveyor regardless of clutter, grasp certain items, and deliver to a sort destination, such as a table, robotic platform, cart, bag, container, or other sort destination, so as to achieve a sort process while the objects are in motion. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated. Some embodiments further include built-in exception handing for unidentified objects, which may be desired for retrofitted fulfillment centers.

Figure 1:
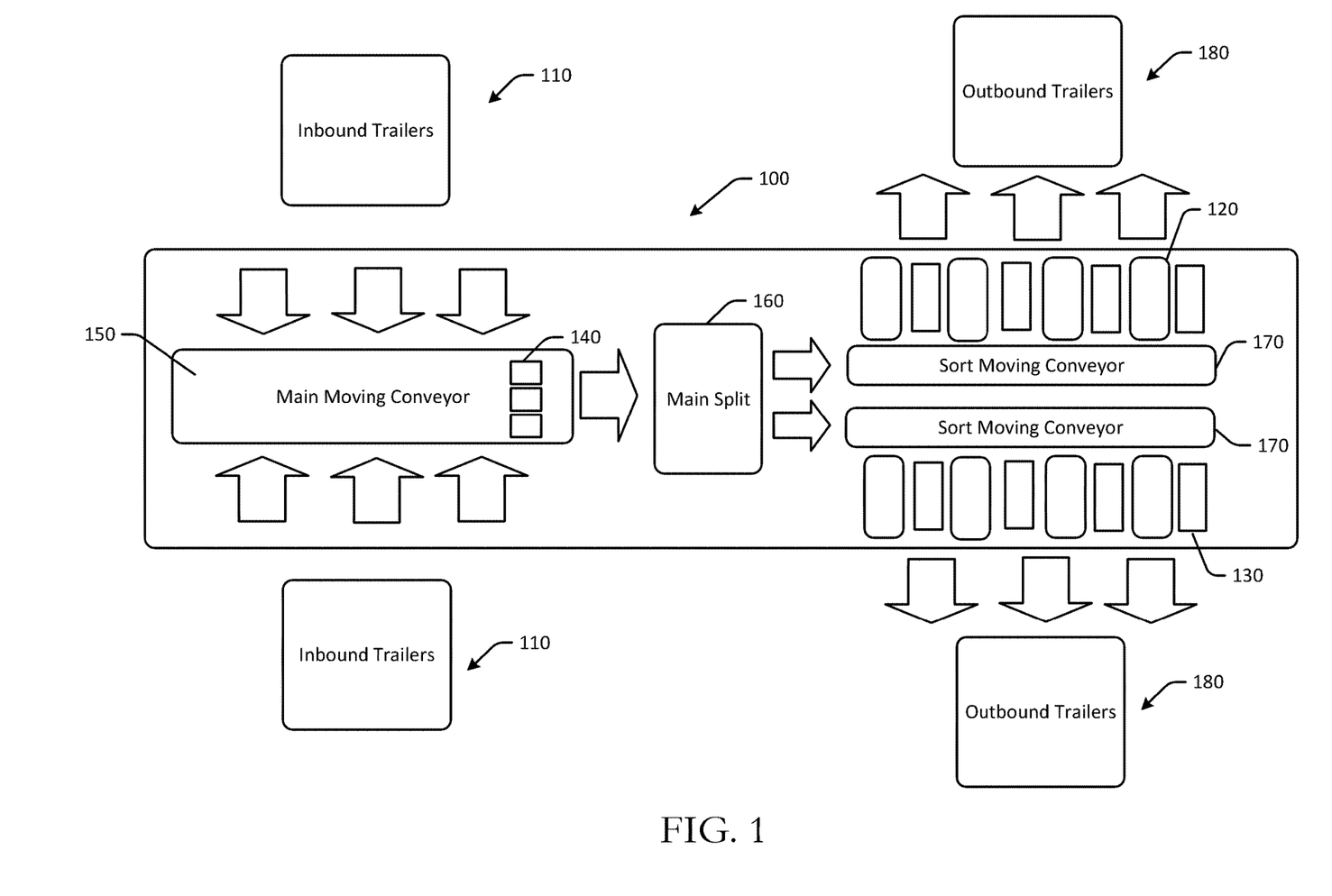
FIG. 1 is a hybrid schematic illustration of an example use case for automated robotic sortation in accordance with one or more embodiments of the disclosure.

Referring to FIG. 1, an example use case for automated robotic sortation and an example process flow in accordance with one or more embodiments of the disclosure. Although discussed in the context of online orders, other embodiments may be directed to any suitable use case where objects are picked and released, such as instances where objects are picked from inventory, placed into containers, removed from containers for sorting, and so forth.

In FIG. 1, a sortation center 100 may include a number of inbound trailers 110 that may deliver packages and/or other items to the sortation center 100. Items 140 may be unloaded from the inbound trailers 110 in a fluid unload and/or Gaylord dump manner onto a main moving conveyor 150 for downstream processing in the sortation center 100. The main moving conveyor 150 may transport items 140 to a main split 160, at which the items 140 may be routed onto one or more sort moving conveyors 170. The sort moving conveyors 170 may transport the respective items to particular areas within the sortation center 100, such as to individual conveyors 120 that may run transverse to the sort moving conveyors 170 and may guide items to destination gaylords, bags, pallets, or other containers 130. When aggregated and/or otherwise sorted, the gaylords, bags, pallets, or other containers 130 may be routed to outbound trailers 180 for transport out of the sortation center.

One or more conveyors 120 may be disposed about the sortation center 120. For example, conveyors 120 may be disposed along sides of the sort moving conveyors 170. The conveyors 120 may run adjacent to the various destinations in some embodiments. Any suitable conveyor configuration may be used. In the illustrated example, the conveyors 120 may include belts or rollers.

At any of the stages of the example sortation process of FIG. 1 where handling of objects is used, such as to pick items from inbound trailers, place items onto conveyors, remove items from one conveyor, place items onto another conveyor, or place items into bags or gaylords or go-carts or other containers for different delivery destinations, and so forth, automated robotic sortation systems and methods as described herein may be used. As a result, manual effort can be redirected to other tasks.

Embodiments of the disclosure include systems and methods for automated robotic sortation. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
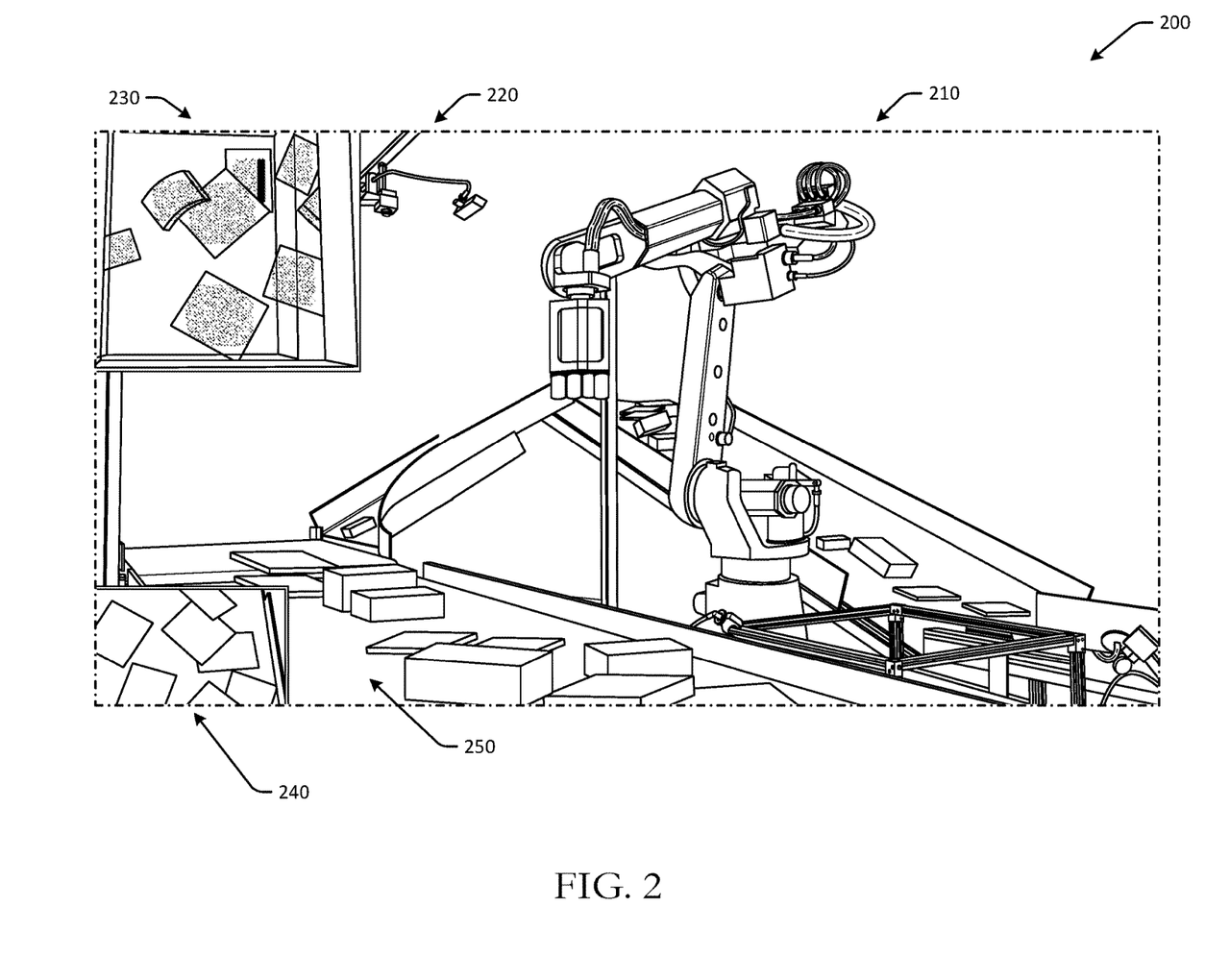
FIG. 2 is a schematic illustration of an example use case for automated robotic sortation in accordance with one or more embodiments of the disclosure.

FIG. 2 is a schematic illustration of an example use case 200 for automated robotic sortation in accordance with one or more embodiments of the disclosure. Other embodiments may include additional or fewer components. The illustration of FIG. 2 may not be to scale, and may not be illustrated to scale with respect to other figures.

In FIG. 2, a robotic arm 210 may be used to pick objects of various form factors and with different packaging materials off of a moving conveyor 250. Objects on the conveyor 250 may be moving, and, in some instances, may be piled onto each other (e.g., an object may be at least partially underneath another object, etc.) in a cluttered environment 240, as depicted in a close-up view in FIG. 2. As a result, identification of objects may be difficult, as well as robotic picking of objects due to decreased accuracy resulting from clutter. The conveyor 250 may be configured to move objects from a first location to a second location. The robotic arm 210 may be configured to pick objects designated for a first destination off the conveyor 250 while the conveyor 250 and/or object is in motion.

The automated robotic sortation system may include an overhead assembly 220. One or more cameras or camera systems may be mounted to the overhead assembly 220, and one or more scanners, such as barcode scanners, may be mounted to the overhead assembly 220. The cameras may be used to generate a point cloud representation 230 that can be used to determine and/or track object location. For example, the point cloud representation 230 may be generated by a three-dimensional camera system and may be a representation of the arrangement and location of objects on the conveyor 250 as the objects approach the robotic arm 210. The point cloud representation 230 may be used to determine a pick point for a certain object at which the robotic arm 210 may grasp the object when the object is near or adjacent to the robotic arm 210. The scanners may be configured to read one or more machine-readable codes on an object to identify the object. For example, a plurality of barcode scanners may be coupled to the overhead assembly 220 and may be configured to detect barcodes on the objects. In some embodiments, a separate scanner may not be needed to identify objects. For example, the camera(s) may be configured to not only generate the point cloud representation 230, but to also identify the object using computer vision and/or integrated hardware. In such embodiments, the objects may be identified using the camera(s) instead of scanner(s).

The robotic arm 210 and/or the automated robotic sortation system depicted in FIG. 2 may be disposed at various locations within a fulfillment center or other facility. For example, sortation of objects may include inbound truck unloading, gaylord dumping, diverting, turning packages to ensure their shipping labels up, splitting packages to different sortation points, picking packages from moving conveyors, stowing to outbound bags, or building pallets or filling outbound gaylords, and so forth. Embodiments may be used at any one or more of these locations to perform sorting or object handling tasks.

Certain embodiments may be configured to generate pick points for objects using, for example, the point cloud 230 that may be invariant to environment lighting, package type, color, and appearance. Some embodiments may accurately identify objects in clutter while avoiding multi-picks (e.g., picking up more than a target object, etc.). Some embodiments may implement multi-criteria pick point ranking for robust picking under hard real-time constraints. Certain embodiments may identify objects while the object is in the grasp of a robotic arm for integrated low cost exception handling.

Embodiments of the disclosure avoid potential issues related to picking objects in cluttered environments, such as multi-pick issues, as well as potential issues related to picking moving objects, such as incorrect pick point determination. As a result, throughput may be increased and sortation accuracy may be increased.

Figure 3:
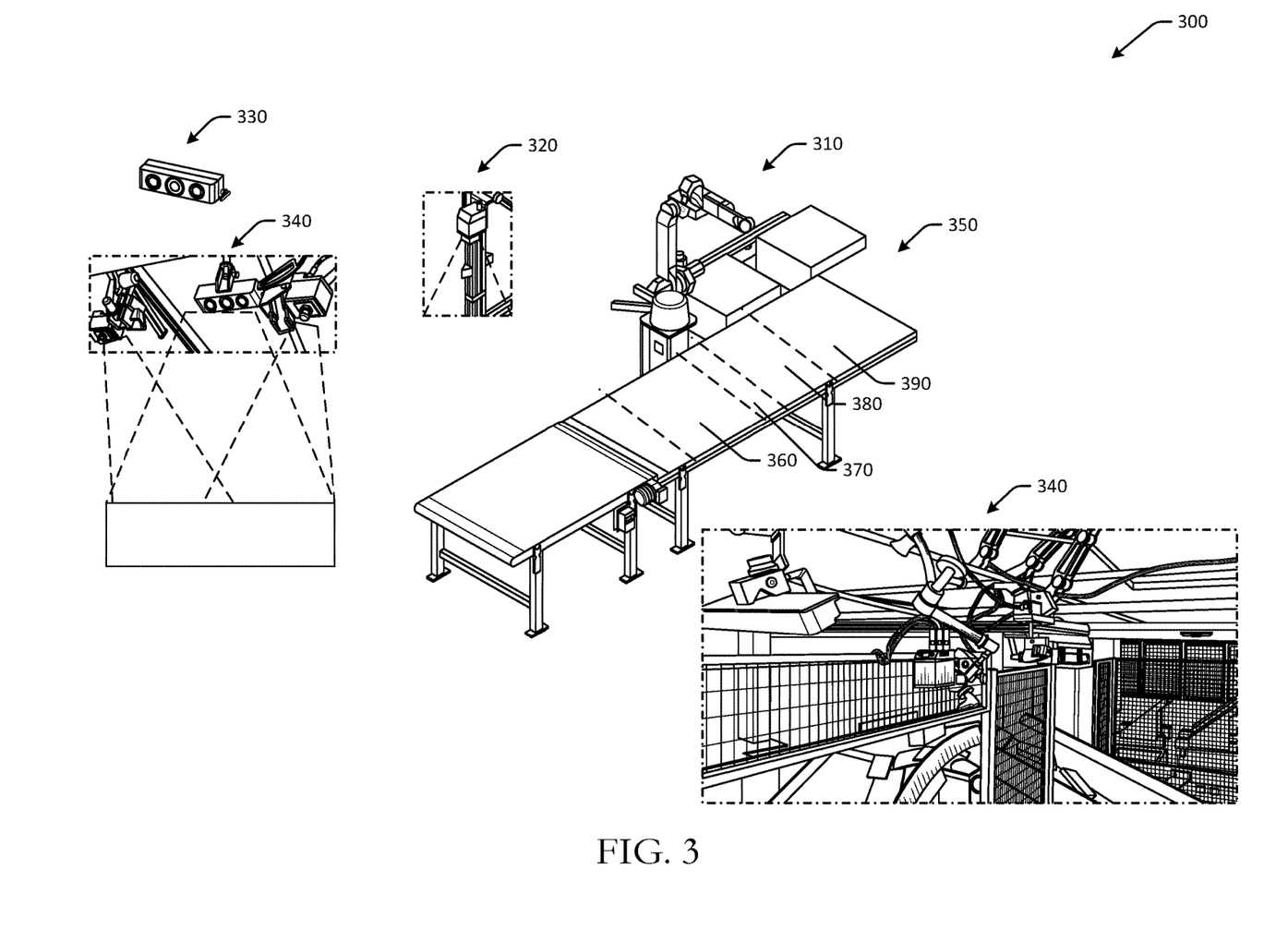
FIG. 3 is a schematic illustration of an example automated robotic sortation system in accordance with one or more embodiments of the disclosure.

FIG. 3 is a schematic illustration of an example automated robotic sortation system 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may be the same automated robotic sortation system discussed with respect to FIGS. 1-2.

In FIG. 3, the automated robotic sortation system 300 may include a first robotic arm 310 configured to grasp a moving object from a conveyor 350 while the conveyor 350 is in motion. In the illustrated example, objects may flow on the conveyor 350 from left to right.

An overhead assembly 340 illustrated both in a sortation environment and close-up view, may include one or more cameras 330 configured to image objects moving on the conveyor 350, and one or more scanners 320 configured to detect machine-readable codes on objects. For example, the camera 330 may be a three-dimensional camera with one or more complementary metal oxide semiconductor sensors. Any number of cameras may be used. The scanners 320 may include one or more barcode scanners or other types of scanners. The scanners 320 may be configured to scan machine-readable codes on objects moving on the conveyor 350. As illustrated, the camera 330 may be mounted between the two barcode scanners on the overhead assembly 340. Some embodiments may include a floor-mounted identification system before package induction with one or more barcode readers to assist in object identification. The camera 330 may be configured to acquire three-dimensional point clouds at a rate of 2 frames per second.

The system 300 may be configured to sort objects from the conveyor 350 using the first robotic arm 310 based at least in part on an object destination. For example, the system 300 may include a controller in communication with the first robotic arm, the camera system, and the first scanner. The controller may be configured to: identify a moving object using the first scanner 320, determine that the first robotic arm 310 is to pick the moving object, track a location of the moving object on the conveyor using the camera system 330, determine a pick point at which the first robotic arm 310 is to pick the moving object, and cause the first robotic arm 310 to grasp the moving object at the pick point. In instances where the controller determines that a plurality of objects was grasped by the first robotic arm 310 instead of the intended target, the controller may cause the first robotic arm 310 to release the plurality of objects back onto the conveyor 350 or elsewhere.

As objects approach the first robotic arm 310, the system 300 may perform certain functions as objects pass through different zones. The different zones are illustrated as discrete segments simply for illustrative purposes in FIG. 3. Actual zones may be overlapping and may occur at different times and/or locations depending on a picking environment and sortation application for which the first robotic arm is being used.

A first zone 360 may be a perception field of view and may have a length on the conveyor 350 of about 1 meter, for example. In the first zone 360, objects may be perceived or otherwise imaged and/or scanned by the camera 330 and/or scanner.

A second zone 370 may be a perception processing zone and may have a length of about 0.25 meter on the conveyor 350. During the second zone 370, the data captured by the system 300 may be used to identify objects, determine a point cloud representation, and/or determine one or more pick points.

A third zone 380 may be a tracking window and may have a length of about 0.5 meters on the conveyor 350. During the third zone 380, objects may be tracked as the flow downstream.

A fourth zone 390 may be a robot pick movement zone and may have a length of about 1 meter on the conveyor 350. During the fourth zone 390, the first robotic arm 310 may move to a pick point, grasp an object, and lift the object. The first robotic arm 310 may sort the object to a particular destination, such as a cart, robotic platform, container, or other destination. The relative size of the zones in FIG. 3 may be different for different applications.

Figure 4:
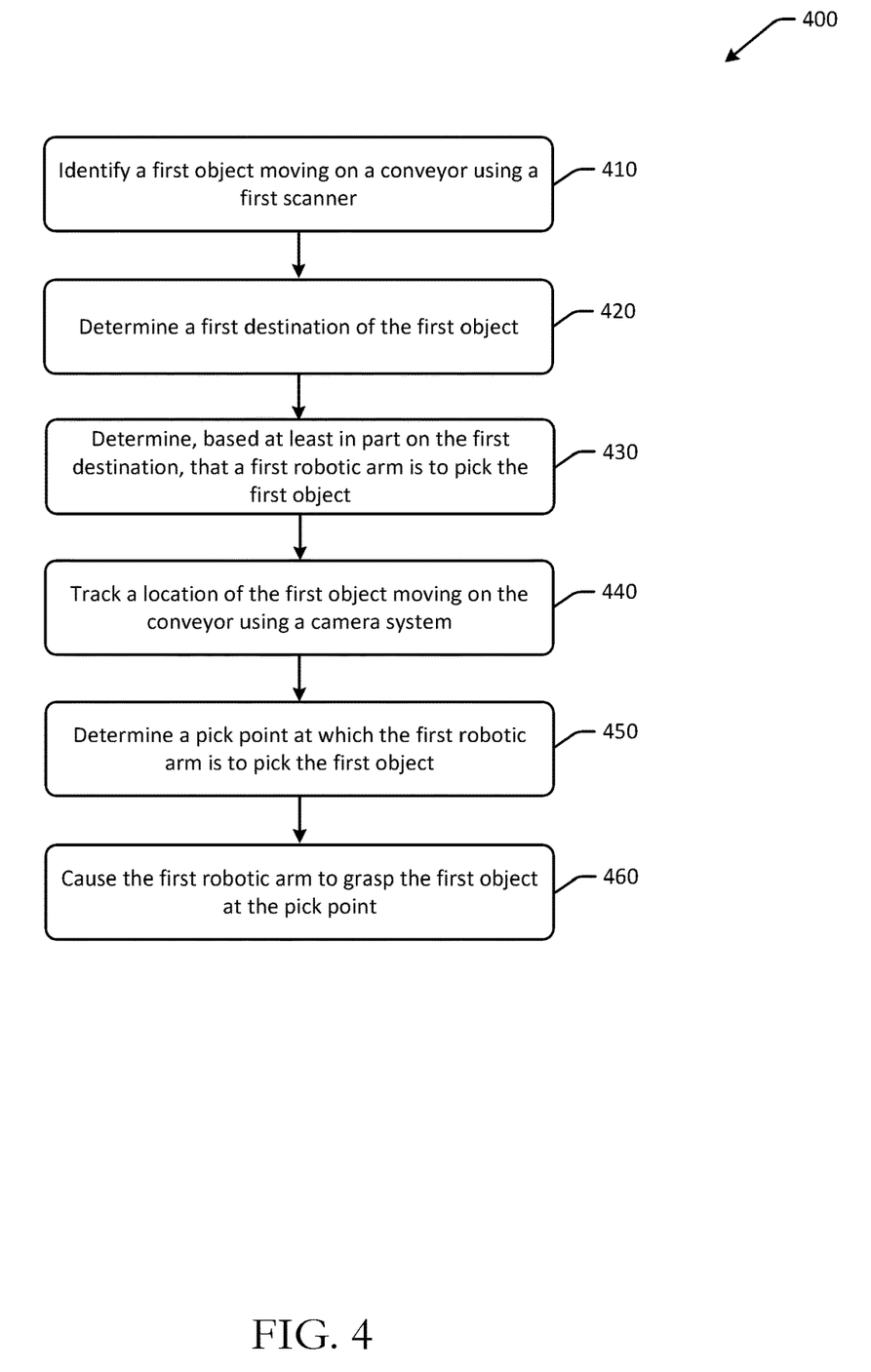
FIG. 4 is a schematic illustration of an example process flow for automated robotic sortation in accordance with one or more example embodiments of the disclosure.

FIG. 4 depicts an example process flow 400 for automated robotic sortation in accordance with one or more example embodiments of the disclosure. While example embodiments of the disclosure may be described in the context of objects, such as packages, it should be appreciated that the disclosure is more broadly applicable to any type of object, such as items, products, containers, bags of products, and so forth. Some or all of the blocks of the process flows in this disclosure may be performed in a distributed manner across any number of devices. The operations of the process flow 400 may be optional and may be performed in a different order.

At block 410 of the process flow 400, computer-executable instructions stored on a memory of a device, such as a remote server or a device controller, may be executed to identify a first object moving on a conveyor using a first scanner. For example, one or more object identification modules at a remote server may be configured to identify a first object moving on a conveyor using a first scanner. To identify the first object, the controller may be configured to use the first scanner, such as a barcode scanner, to scan a barcode or other machine-readable code on the object. The controller may use data associated with the machine-readable code to determine or otherwise identify the object. Based at least in part on the identified object and/or associated data, the controller may determine characteristics of the object, such as weight, dimensions, and/or other characteristics.

At block 420 of the process flow 400, computer-executable instructions stored on a memory of a device, such as a remote server or a device controller, may be executed to determine a first destination of the first object. For example, one or more object tracking modules at a remote server at a remote server may be configured to determine a first destination of the first object. The controller may be in communication with a database and/or other computer system. Based at least in part on the identified object (e.g., an object identifier determined using the barcode, etc.), the controller may determine a first destination of the first object. The first destination may be a destination internal to a fulfillment center (e.g., a certain loading dock, sorting router, sortation machine, etc.) or external to the fulfillment center (e.g., a physical address, etc.). The first destination may represent a container, such as a cart, box, bag, or other container. The first destination may be associated with a particular robotic arm. For example, a particular robotic arm may be configured to pick items off of a moving container that are destined for one particular destination or group of destinations. In FIG. 4, the controller may determine that the object that was identified is to be picked by a particular robotic arm.

At block 430 of the process flow 400, computer-executable instructions stored on a memory of a device, such as a remote server or a device controller, may be executed to determine, based at least in part on the first destination, that a first robotic arm is to pick the first object. For example, one or more object identification modules at a remote server may determine, based at least in part on the first destination, that a first robotic arm is to pick the first object. A particular robotic arm may be configured to pick objects destined for certain destinations. The first robotic arm may be configured to pick objects destined for the first destination. Accordingly, the controller may determine, based at least in part on the first destination, that the first robotic arm is to pick the first object.

At block 440 of the process flow 400, computer-executable instructions stored on a memory of a device, such as a remote server or a device controller, may be executed to track a location of the first object moving on the conveyor using a camera system. For example, one or more object tracking modules at a remote server may be configured to track a location of the first object moving on the conveyor using a camera system. To track the location, the controller may determine a current position of the object upstream of the first robotic arm, and may determine an expected location of the object when the object will be adjacent to the first robotic arm. As discussed herein, the controller may determine a pick point for the first object that corresponds to the expected location of the object when the object is or will be adjacent to the first robotic arm.

At block 450 of the process flow 400, computer-executable instructions stored on a memory of a device, such as a remote server or a device controller, may be executed to determine a pick point at which the first robotic arm is to pick the first object. For example, one or more object tracking modules at a remote server may determine a pick point at which the first robotic arm is to pick the first object. The pick point may be a point at which the robotic arm is to move in order to retrieve or otherwise grasp the first object. The pick point may be represented using three-dimensional coordinates and may correspond to the estimated location of the object when the object is adjacent to the first robotic arm.

At block 460 of the process flow 400, computer-executable instructions stored on a memory of a device, such as a remote server or a device controller, may be executed to cause the first robotic arm to grasp the first object at the pick point. For example, one or more control modules at a remote server may cause the first robotic arm to grasp the first object at the pick point. The controller may cause the first robotic arm to move to the pick point, and may cause the first robotic arm to grasp the first object using an end of arm tool or end effector, such as one or more suction cups, a two-fingered gripper, a claw, or other end of arm tool.

The controller may cause the first robotic arm to move the first object to a designated location, such as over a container, a surface (e.g., table top, container, etc.), a robotic platform on top of a robot, etc., and may cause the first robotic arm to drop the first object. The first object may therefore be dropped or placed into a container, into a chute, onto a robotic platform that is adjacent to the first robotic arm, or elsewhere for further processing.

In some embodiments, the controller may be configured to determine whether a multi-pick incident has occurred. For example, a multi-pick incident may be an instance where an additional object was picked up in addition to a target object, where the additional object may or may not be destined for the same destination as the target object. Multi-pick detection may be performed using a camera system that images the contents picked by the robotic arm, or by using before and after images of the conveyor (e.g., before and after the pick event, etc.) to determine which objects were picked. For example, the controller may determine that a plurality of objects was grasped by the first robotic arm, and may cause the first robotic arm to release the plurality of objects. The objects may be released back onto the conveyor or onto another surface.

In some embodiments, objects may not be identified while on the conveyor. For example, barcodes may be facing down or may be covered by other objects in a cluttered environment. In such instances, the automated sortation systems described herein may use robotic arms to retrieve or lift objects, such that the objects can be identified and/or reoriented for later identification. For example, the controller may determine that a second object on the conveyor cannot be identified, and may cause the first robotic arm to grasp the second object. The controller may identify the second object after the first robotic arm grasps the second object. For example, the camera system or a separate camera system may be used to scan a machine-readable code on the object after the object has been grasped and/or lifted by the robotic arm. In another example, if the object is at least partially underneath a second object or otherwise covered by a second object, the controller may cause the object to be lifted by the robotic arm, such that the object can be identified. If, after being identified, the object is not designated to be picked by the robotic arm that picked it, the object may be placed on the conveyor and may flow downstream. In some embodiments, a manual sortation station may be disposed at or near an end of the conveyor, at which the object can be manually sorted.

Figure 5:
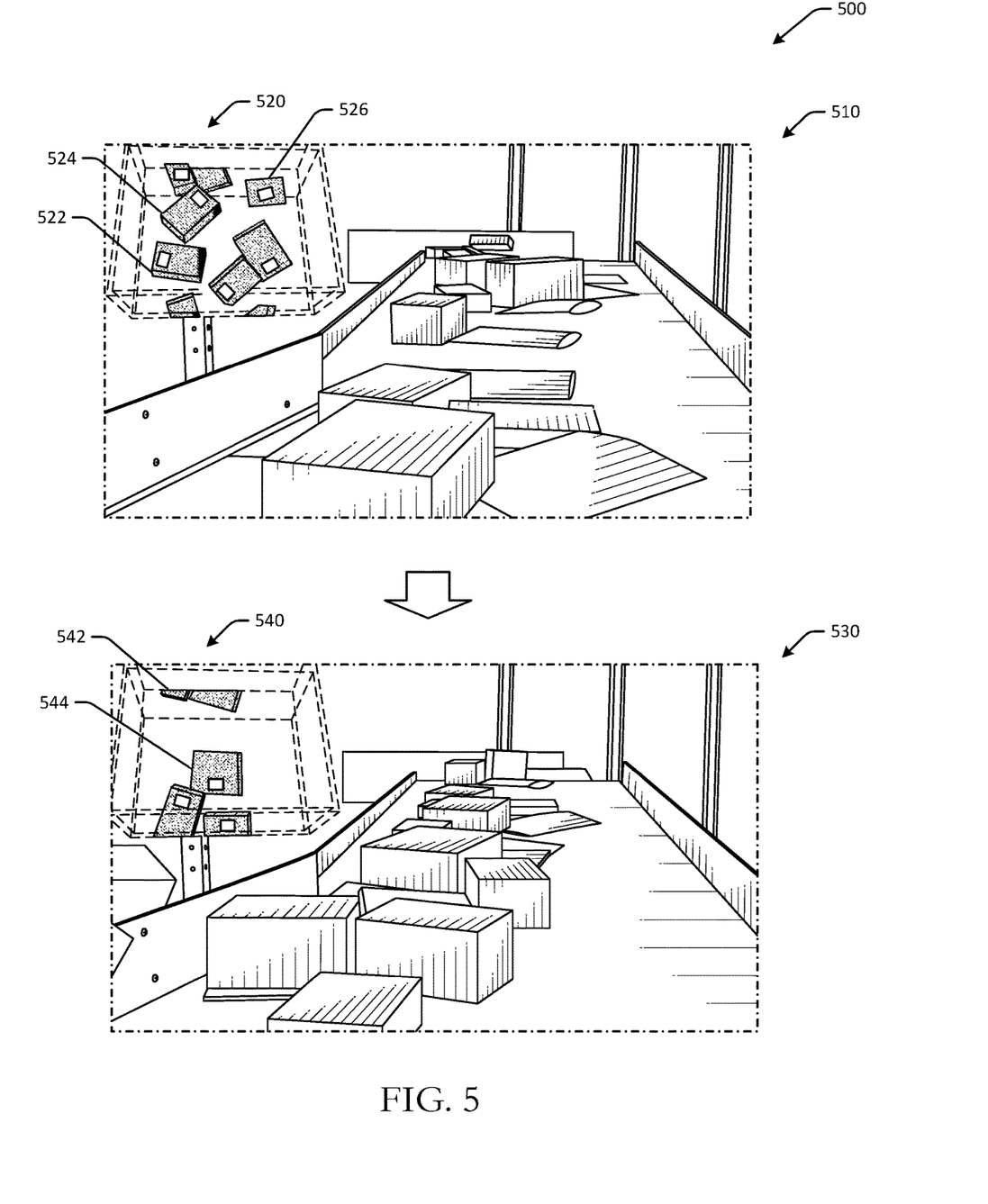
FIG. 5 is a schematic illustration of an example use case for object identification and pick point determination in accordance with one or more embodiments of the disclosure.

FIG. 5 is a schematic illustration of an example use case 500 for object identification and pick point determination in accordance with one or more embodiments of the disclosure. Other embodiments may include additional or fewer components. The illustration of FIG. 5 is not to scale, and may not be illustrated to scale with respect to other figures. The system illustrated in FIG. 5 may be the same automated robotic sortation system discussed with respect to FIGS. 1-4.

In FIG. 5, at a first instance 510, a plurality of packages may be flowing on a moving conveyor belt. An overhead camera assembly may be used to generate a first point cloud representation 520 of the packages as they pass under the camera assembly. In the first point cloud representation 520, a number of packages may be identified, such as a first package 522, a second package 524, a third package 524, a fourth package 526, and so forth, where the different packages have different respective representations in the first point cloud representation 520.

At a second instance 530, a second point cloud representation 540 may be generated using the camera assembly, and may include a fifth package 542, a sixth package 544, and so forth. As the packages continue to move, the system may continue to generate point cloud representations. Point cloud representations may be used in conjunction with conveyor encoder readings to determine and/or track object location as the conveyor and/or object moves downstream.

The first point cloud representation 520 and the second point cloud representation 540 may be three-dimensional point clouds, and may be pre-processed by the sortation system by, for example, applying a Gaussian filter and removing any clusters outside of a region of interest. Some embodiments may implement a two-staged three-dimensional segmentation. The first-stage segmentation may use a smooth region growing technique based on surface curvature and normal differences in the point cloud. Although the first-stage segmentation may be sufficient for boxes or other rectangular object, under-segmentation may occur for highly cluttered flat packages, due to connected three-dimensional clusters. To mitigate multi-picks due to under-segmentation, a heuristic evaluation may be implemented to compute a confidence score for each segment. For example, a segment may hold a three-dimensional convex shape while under-segmented clusters may demonstrate some form of concave shape. Some embodiments may compute the ratio of the segment pixel volume and the corresponding convex hull volume as a confidence score. The confidence score may be representative of a likelihood that the segment corresponds to a single object. When this confidence score is below a threshold, the second-stage segmentation can be applied using the non-smooth region growing technique where the surface curvature and normal differences are compared with the original segment seed point instead of their nearest neighbors. This two-stage segmentation approach separates overlapping thin packages while avoiding over-segmentation on bulky, curvy packages.

For instances where a package cannot be identified in a current orientation on the conveyor, the system may include a controller in communication with a first robotic arm, a first scanner, and a camera system. The controller may be configured to determine that the moving object cannot be identified using a first scanner, track a location of the moving object on the conveyor using the camera system, and cause the first robotic arm to grasp the moving object. The controller may identify the moving object after the first robotic arm grasps the moving object, and cause the first robotic arm to place the moving object onto an exception handling conveyor. The exception handling conveyor may be directed to a manual sortation station for manual handling.

Figure 6:
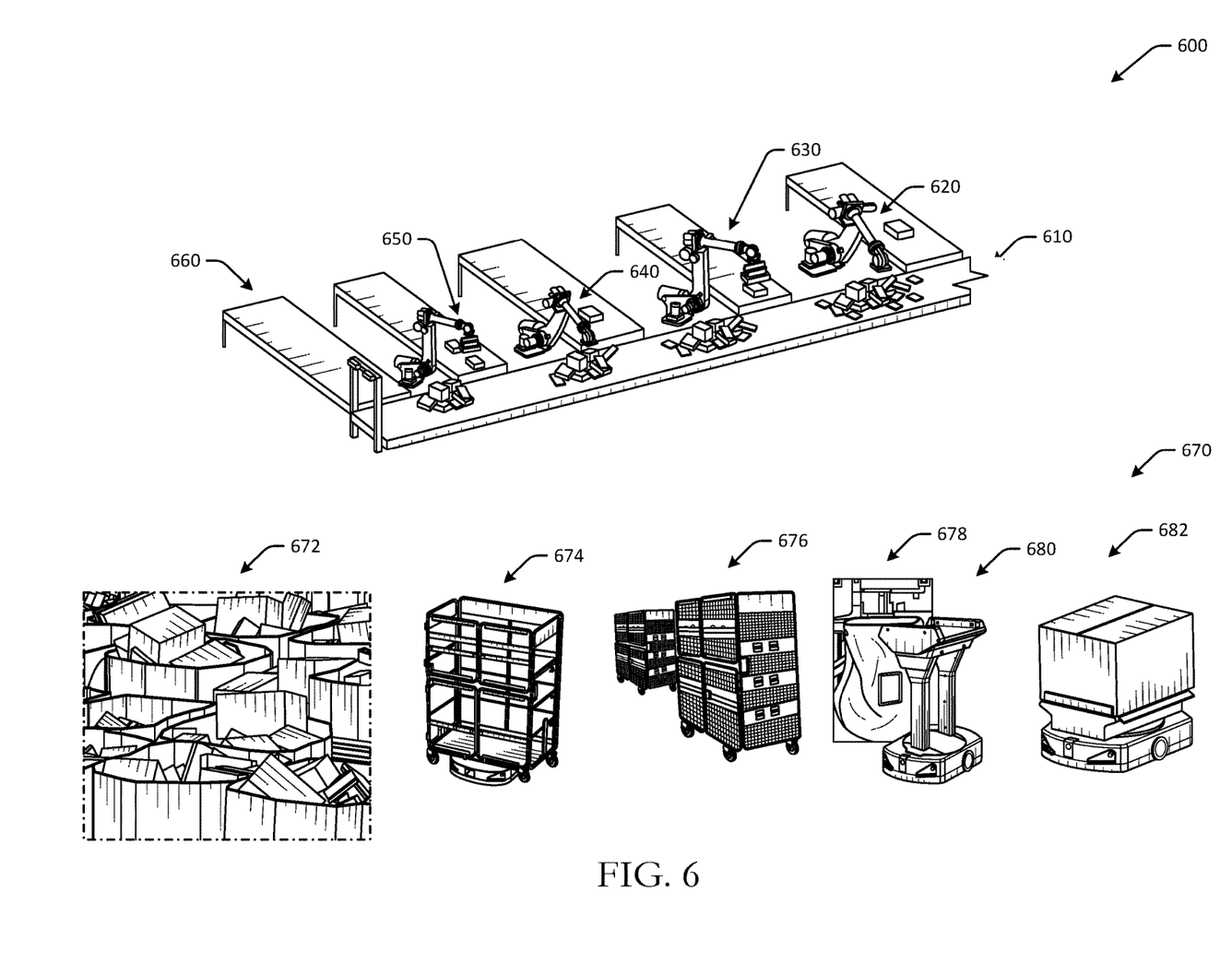
FIG. 6 is a schematic illustration of an example use case for automated robotic sortation with different drop destinations in accordance with one or more embodiments of the disclosure.

FIG. 6 is a schematic illustration of an example use case 600 for automated robotic sortation with different drop destinations in accordance with one or more embodiments of the disclosure. Other embodiments may include additional or fewer components. The illustration of FIG. 6 is not to scale, and may not be illustrated to scale with respect to other figures. The system illustrated in FIG. 6 may be the same automated robotic sortation system discussed with respect to FIGS. 1-5.

In FIG. 6, a conveyor 610 may be used to flow objects in a certain direction. A manual sortation station 660 may be disposed at or near an end of the conveyor. A number of robotic arms may be disposed on one or more sides along the conveyor 610. For example, a first robotic arm 620 may be disposed adjacent to the conveyor 610, a second robotic arm 630 may be disposed adjacent to the conveyor 610, a third robotic arm 640 may be disposed adjacent to the conveyor 610, a fourth robotic arm 650 may be disposed adjacent to the conveyor 610, and so forth. Any number of robotic arms may be included. The robotic arms 620, 630, 640, 650 may be configured to move objects from the conveyor 610 to different destinations, such as into a container, into a chute, onto a robotic platform that is adjacent to the robotic arm, and/or other drop destinations. The second robotic arm 630 may be positioned adjacent to the conveyor 610 and downstream of the first robotic arm 620. The first robotic arm 620 may be configured to pick objects designated for a first destination, and the second robotic arm 630 may be configured to pick objects designated for a second destination, and so forth. The respective robotic arms may therefore be configured to sort the individual objects into different respective drop destinations, each of which may be different. For objects not sorted by the respective robotic arms, the objects may flow to the manual sortation station 660 at which objects not picked by the robotic arms flow to the manual sortation station for manual handling.

Any number of drop destinations 670 may be included and may be compatible with the automated robotic sortation systems described herein. For example, robotic arms may drop packages or other objects in particular gaylords 672, particular large carts 674, particular small carts 676, particular bags 678, particular drivable carts 680, particular robotic platforms 682, another conveyor, and/or other destinations. Objects may be dropped or delivered by the robotic arm to the drop destination individually.

Figure 7:
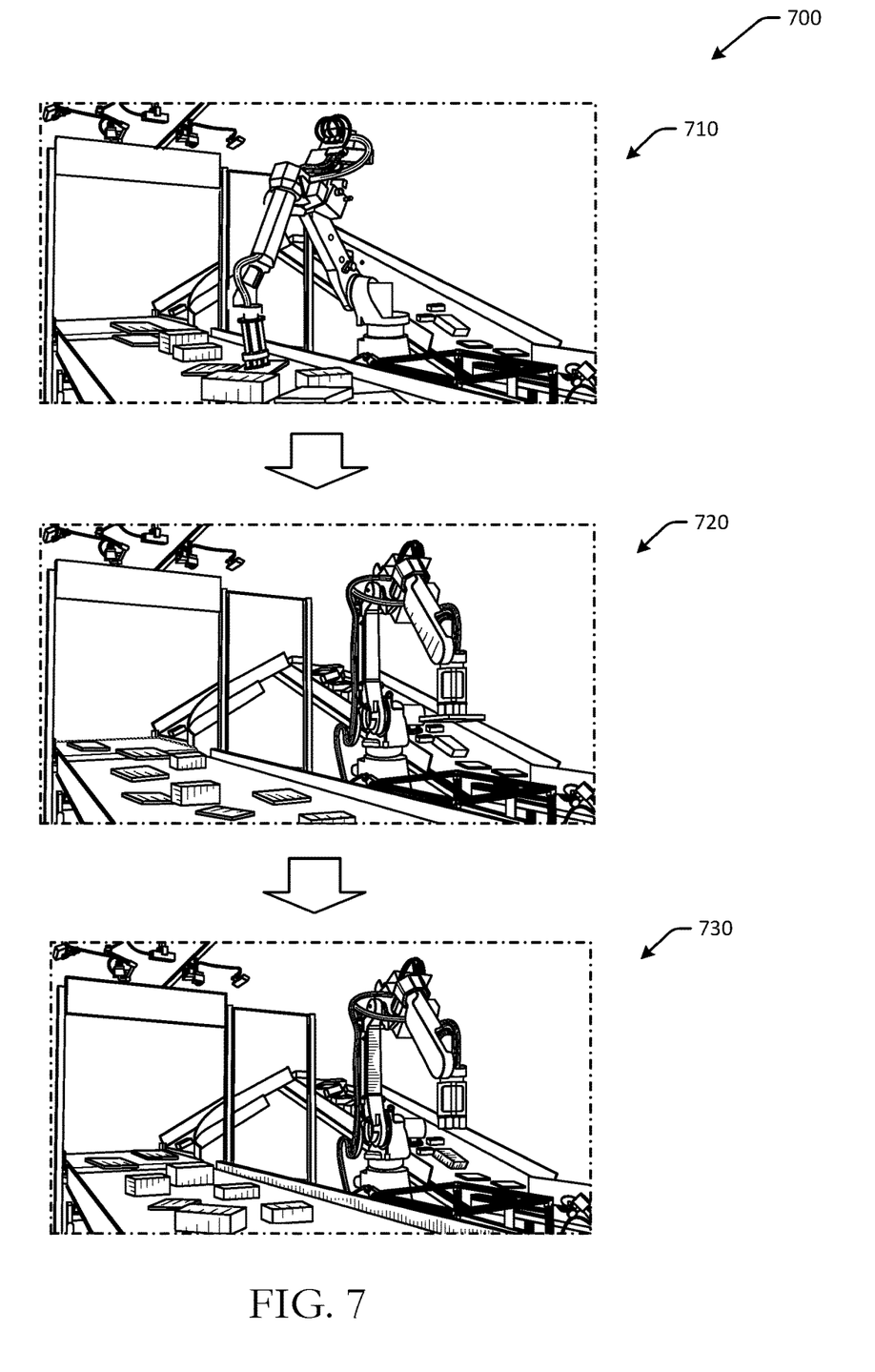
FIG. 7 is a schematic illustration of an example use case for automated robotic sortation in accordance with one or more embodiments of the disclosure.

FIG. 7 is a schematic illustration of an example use case 700 for automated robotic sortation in accordance with one or more embodiments of the disclosure. Other embodiments may include additional or fewer components. The illustration of FIG. 7 is not to scale, and may not be illustrated to scale with respect to other figures. The system illustrated in FIG. 7 may be the same automated robotic sortation system discussed with respect to FIGS. 1-6.

In FIG. 7, at a first instance 710, a robotic arm is illustrated in an environment that includes a conveyor with cluttered packages. Other embodiments may have different types of objects instead of packages. At the first instance 710, a camera system may be used to perceive and/or identify packages that flow towards a robotic arm (as illustrated). The packages may be identified before the packages approach the robotic arm. In some embodiments, the packages may be identified using three-dimensional positioning coordinates. A specific package may be identified and determined for picking by the robotic arm.

At a second instance 720, the robotic arm may grasp the package and move the packaged to a cart disposed adjacent to the conveyor and/or the robotic arm. To pick the package, the robotic arm may initiate a pick-and-place cycle at a pounce position above the pick zone for the robotic arm. The system and/or the robotic arm may evaluate all of the pick positions in a position buffer to determine the best pick position within a tracking and picking zone. For example, a number of pick positions may be in the position buffer, but certain positions may be favorable due to exposed surface area, proximity to adjacent objects, and so forth. Pick points may be generated by fitting plane and computing the principle axes of highly confident segments. Generated pick points can be ranked by a set of weights to ensure the high probability of robust picking from cluttered packages in motion. Ranking criteria can include pick point height, pick approach angle, pick segment area, pick segment confidence, and/or identification in cluttered status. Multi-criteria pick point ranking may be used to prioritize picking from the top of the clutter, flat facing packages, and highly confident segments. Due to the limited time window within the picking zone, the top ranked pick point can be updated to the robotic arm each perception loop.

The robotic arm may execute the picking action while the package is tracked in motion on the conveyor using the camera system and/or optional conveyor encoder inputs. For packages with valid identification, the robotic arm may move and drop the packages to a corresponding sort positions.

At a third instance 730, the package may be dropped by the robotic arm into a container, or may be placed in a designated location for sortation. For packages without valid identification or that otherwise were not identified, the robotic arm may move to a predetermined location for attempted identification of the package while in the grasp of the robotic arm. For example, the robotic arm may rotate the package so that two floor-mounted barcode readers (or other camera system) may have an increased likelihood of reading and/or scanning labels on a side or bottom of the packages. Once identified, the robotic arm may move and drop the package to the corresponding sort position. If still unidentified, the package may be dropped back to the conveyor. The robot pick-and-place loop time may be dependent of the drop position for sortation. For the closest drop position, in one example, the loop time is about 3 seconds (e.g., 1200 packages per hour, etc.).

In addition, some embodiments may be configured to reject multi-pick events where more than one package or object may be picked up at the same time by the robotic arm. For example, a camera system may be used to determine what object(s) have been grasped by the robotic arm, or before and after images may be captured and used to determine which objects were retrieved by the robotic arm.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
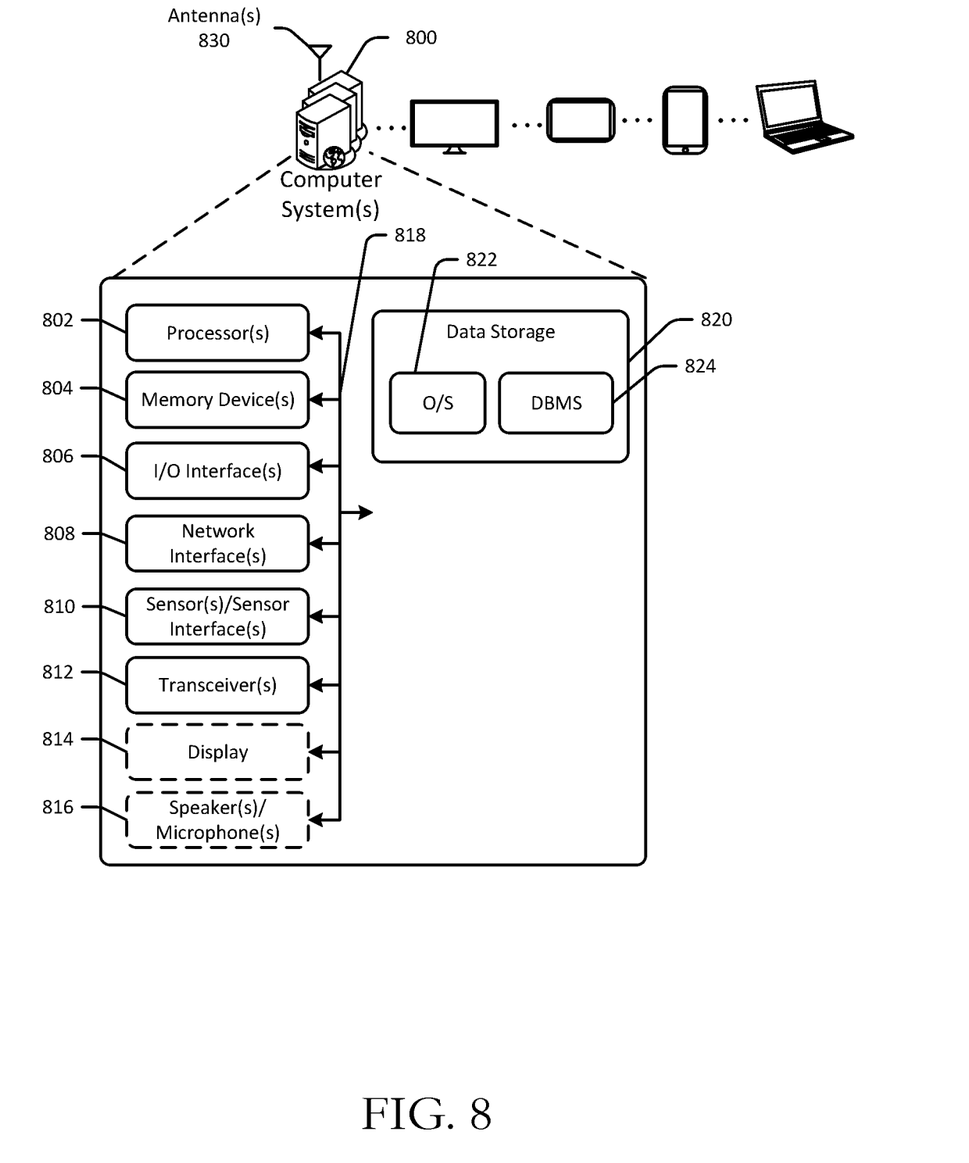
FIG. 8 schematically illustrates an example architecture of a computer system associated with an automated robotic sortation system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the device(s) of FIGS. 1-7. For example, the computer system(s) 800 may be a controller and may control one or more aspects of the automated robotic sortation system described in FIGS. 1-7.

The computer system(s) 800 may be configured to communicate with one or more servers, user devices, or the like. The computer system(s) 800 may be configured to identify items, retrieve items, move items, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830— transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830— communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic sortation system comprising:
    a conveyor configured to move objects from a first location to a second location;
    a first robotic arm disposed adjacent to the conveyor, the first robotic arm configured to pick objects designated for a first destination off the conveyor while the conveyor is in motion;
    a second robotic arm disposed adjacent to the conveyor, the second robotic arm configured to pick objects designated for a second destination off the conveyor while the conveyor is in motion;
    a three-dimensional camera configured to image the objects on the conveyor;
    a plurality of barcode scanners configured to detect barcodes on the objects; and
    a controller in communication with the first robotic arm, the camera system, and the first scanner, the controller configured to:
        determine a pick point at which the first robotic arm is to pick a first object;

cause the first robotic arm to grasp the first object at the pick point;
determine that a plurality of objects was grasped by the first robotic arm; and
cause the first robotic arm to release the plurality of objects;
wherein the first robotic arm and the second robotic arm are configured to move objects from the conveyor into respective containers or onto robotic platforms.

2. The robotic sortation system of claim 1, wherein the controller is further configured to:
identify the first object using the plurality of barcode scanners;
determine that the first robotic arm is to pick the first object; and
track a location of the first object on the conveyor using the three-dimensional camera.

3. The robotic sortation system of claim 1, further comprising:
a manual sortation station disposed at or near an end of the conveyor, such that objects not picked by the first robotic arm or the second robotic arm flow to the manual sortation station.

4. A system comprising:
a first robotic arm configured to grasp a moving object from a conveyor while the conveyor is in motion;
a camera system configured to image objects moving on the conveyor;
a first scanner configured to scan machine-readable codes on objects moving on the conveyor; and
a controller in communication with the first robotic arm, the camera system, and the first scanner, the controller configured to:
determine a pick point at which the first robotic arm is to pick the moving object;
cause the first robotic arm to grasp the moving object at the pick point;
determine that a plurality of objects was grasped by the first robotic arm; and
cause the first robotic arm to release the plurality of objects;
wherein the system is configured to sort objects from the conveyor using the first robotic arm based at least in part on an object destination.

5. The system of claim 4, wherein the controller is further configured to:
identify the moving object using the first scanner;
determine that the first robotic arm is to pick the moving object; and
track a location of the moving object on the conveyor using the camera system.

6. The system of claim 4, wherein the moving object is at least partially underneath another object.

7. The system of claim 4, wherein the controller is further configured to:
determine that the moving object is unidentifiable using the first scanner;
track a location of the moving object on the conveyor using the camera system;
cause the first robotic arm to grasp the moving object;
determine that the moving object is unidentifiable after the first robotic arm grasps the moving object; and
cause the first robotic arm to place the moving object onto an exception handling conveyor.

8. The system of claim 4, wherein the first robotic arm is disposed adjacent to the conveyor, and wherein the camera system and first scanner are both disposed over the conveyor.

9. The system of claim 4, further comprising:
a second robotic arm positioned adjacent to the conveyor downstream of the first robotic arm;
wherein the first robotic arm is configured to pick objects designated for a first destination, and the second robotic arm is configured to pick objects designated for a second destination.

10. The system of claim 4, further comprising:
a manual sortation station disposed at or near an end of the conveyor, such that objects not picked by the first robotic arm flow to the manual sortation station.

11. The system of claim 4, further comprising:
a second scanner configured to scan machine-readable codes on objects moving on the conveyor;
wherein the machine-readable codes are barcodes, and wherein the camera system comprises a three-dimensional camera.

12. The system of claim 4, wherein the first robotic arm is configured to move objects from the conveyor into a container, into a chute, or onto a robotic platform that is adjacent to the first robotic arm.

13. A method comprising:
identifying, by a controller of a system, a first object moving on a conveyor using a first scanner;
determining a first destination of the first object;
determining, based at least in part on the first destination, that a first robotic arm is to pick the first object;
tracking a location of the first object moving on the conveyor using a camera system;
determining a pick point at which the first robotic arm is to pick the first object;
causing the first robotic arm to grasp the first object at the pick point;
determining that a plurality of objects was grasped by the first robotic arm; and
causing the first robotic arm to release the plurality of objects.

14. The method of claim 13, further comprising:
causing the first robotic arm to drop the first object into a container, into a chute, or onto a robotic platform that is adjacent to the first robotic arm.

15. The method of claim 13, further comprising:
determining that a second object is unidentifiable;
causing the first robotic arm to grasp the second object; and
identifying the second object after the first robotic arm grasps the second object.

16. The method of claim 13, wherein the first object is at least partially underneath a second object.

17. The method of claim 13, wherein a manual sortation station is disposed at or near an end of the conveyor.

* * * * *